April 24, 1951 L. F. MAYLE 2,549,834

CONTROL CIRCUIT FOR MULTIPLE SOUND REPRODUCERS

Filed Jan. 9, 1948

INVENTOR.

LOUIS F. MAYLE

BY Arthur A. Smith

ATTORNEY

Patented Apr. 24, 1951

2,549,834

UNITED STATES PATENT OFFICE 2,549,834

CONTROL CIRCUIT FOR MULTIPLE SOUND REPRODUCERS

Louis F. Mayle, Fort Wayne, Ind., assignor to Farnsworth Television & Radio Corporation, a corporation of Delaware Application January 9, 1948, Serial No. 1,435

12 Claims. (Cl. 179—100.2)

This invention relates generally to control circuits, and particularly relates to a relay circuit for automatically controlling the operation of two magnetic sound reproducers.

A magnettic sound reproducer provides for longer uninterrupted entertainment than other sound reproducing devices such as an automatic record changer. Thus a conventional magnetic reproducer will provide an entertainment program over periods of time ranging from one to approximately four hours. However, after the magnetic reproducer has played back the recorded program, the magnetic medium which may consist of a flexible wire or tape must be rewound, and this rewinding operation may require as much time as that needed for the play-back operation.

Accordingly, when a relatively continuous source of entertainment is required, it is desirable to provide two reproducing units so that while one unit is utilized for playing back the recorded program, the other will simultaneously rewind its wire or tape from the take up reel to the supply reel. Such an arrangement will also provide for a greater variety of the program material which may be made available. If two magnetic reproducing units are used, it is desirable to control their operation automatically. In certain prior art automatically controlled reproducing units an interruption in the power supply causes a reversal of the operation of the two units so that the unit which was previously playing back is now rewinding while the other unit is playing back. A further drawback of prior control circuits is the fact that they constantly consume power because their magnetic switches must be continuously energized as long as the reproducing units are operating. Furthermore, since the two reproducing units may require a different length of time for performing the rewinding and play back operations, it is desirable to control the units in such a manner that both start simultaneously after they have completed their respective play back or rewinding operation.

It is an object of the present invention, therefore to provide a novel control circuit for two magnetic sound reproducers, one of which is playing back a recorded program while the other is simultaneously rewinding, which will reverse the operation of the two reproducer units only after both units have completed their previous operation and will start both units again simultaneously.

A further object of the invention is to provide a control circuit of the type referred to including a plurality of control relays where the cycle of operation is not affected by an interruption of the power supply and where the control relays need only be energized momentarily.

Another object of the invention is to provide a relay control circuit for two magnetic reproducer units wherein the function of the two units is automatically reversed only after a predetermined time delay to insure that the motors of the two units are completely stopped before both are energized again simultaneously to run in a reverse direction thereby to prevent breaking of the magnetic recording medium.

Still a further object of the invention is to provide a control circuit for two magnetic reproducer units with a control switch for stopping at will a selected unit after it has finished its rewinding and its play back operation and after the associated unit has finished its rewinding operation or to stop both units when they have finished their present play back and rewinding operations.

In accordance with the present invention there is provided a circuit for controlling the operation of two magnetic reproducers. Each magnetic reproducer is provided with a recording medium and with a supply reel and a take up reel for each of the recording media. There are provided a first and second reversible motor for the magnetic reproducers for selectively winding the recording medium of each reproducer from one of its reels on the other reel. Furthermore, first and second trip means are associated respectively with the two reproducers, each trip means being adapted to be actuated when the recording medium is substantially wound upon one of its associated reels.

The circuit for controlling the operation of the reproducers comprises a first relay means for controlling the energization of the first motor and arranged to be actuated by the first trip means. There is further provided a second relay means for controlling the energization of the second motor and arranged to be actuated by the second trip means. There is provided a third relay means for controlling the direction of rotation of the motors. The first and second relay means are arranged in one position to energize the motors and are arranged in another position to de-energize them. The third relay means is responsive to the actuation of the first and second relay means to reverse the direction of rotation of the motors. Finally means are provided which are operable after the actuation of the third relay means for reactuating the first and second relay means to energize the motors in a reverse direction. The last means preferably consists of a time delay relay which is responsive to the actuation of the first and second relay means and operative after a predetermined length of time for substantially simultaneously reactuating the first and second relay means thereby to insure that the third relay means is actuated before the first and second relay means are reactuated.

For a better understanding of the invention, together with other and further objects thereof, reference is made to the following description, taken in connection with the accompanying drawing, and its scope will be pointed out in the appended claims.

Figure 1:
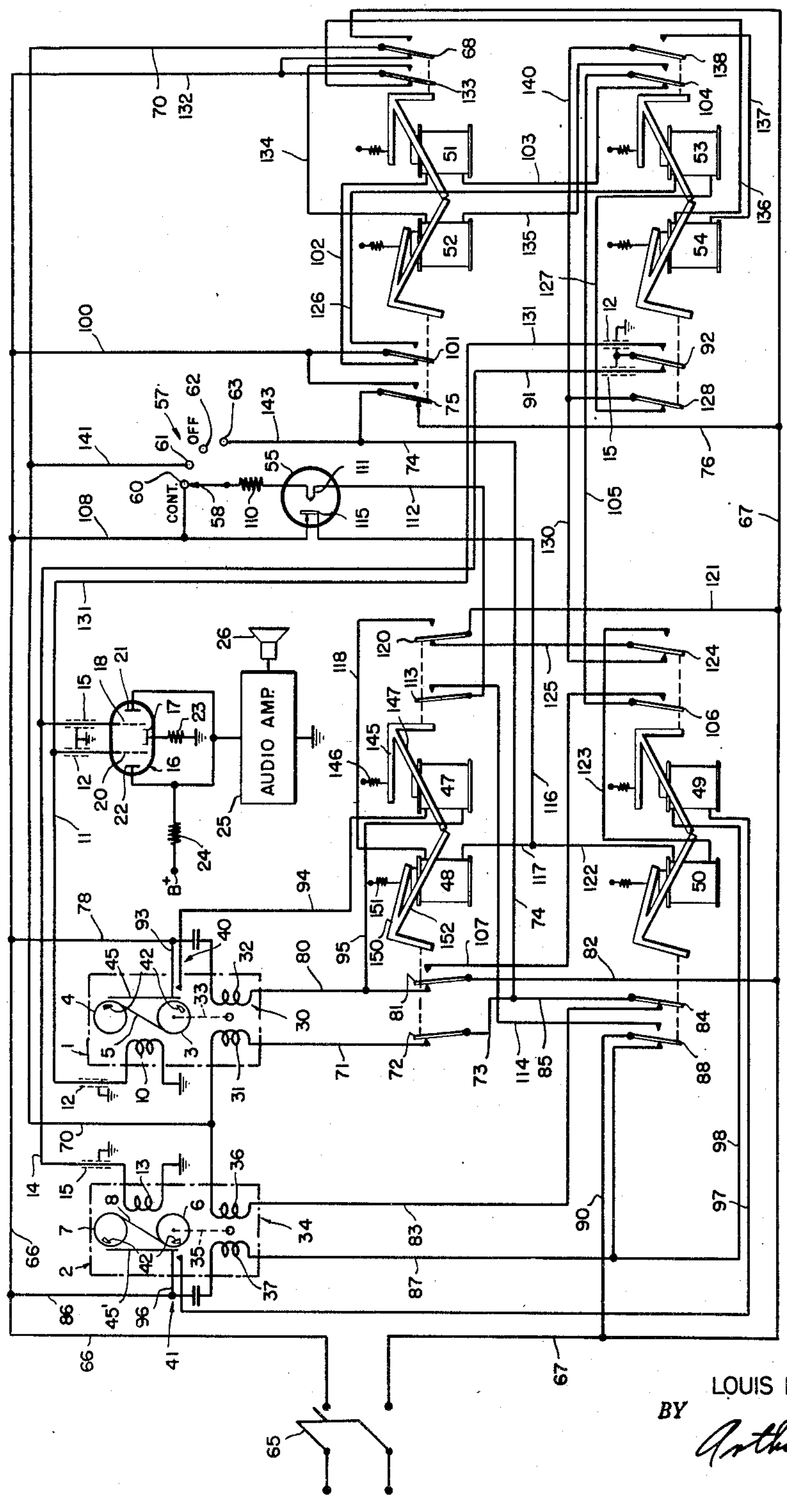
Fig. 1 is a circuit diagram of the control circuit for controlling two magnetic sound reproducers of the present invention.

Referring now to Fig. 1, there is illustrated a control circuit for two magnetic sound reproducer units 1 and 2 which may be identical in construction. Reproducer unit 1 comprises two reels 3 and 4, one of which is the supply reel while the other one is the take up reel. The magnetic recording medium shown at 5 may consist of a thin flexible magnetic material such as a tape, or a wire as illustrated. Reproducer unit 2 also comprises two reels 6 and 7, on one of which the recording wire 8 is stored. A sound head 10 illustrated schematically by a coil is positioned adjacent wire 5 for developing audio signals when wire 5 is moved past the sound head. One terminal of coil 10 is grounded as shown while the other is connected to conductor 11 which may be covered by grounded sheath 12. Reproducer unit 2 is also provided with sound head 13 having one terminal grounded while its other terminal is connected to conductor 14 covered by grounded sheath 15.

The audio signals developed by sound heads 10 and 13 are selectively amplified by twin tube 16 having cathodes 17, control grids 18, 20 and anodes 21, 22. Cathodes 17 are grounded through cathode resistor 23 while the anodes are connected through common anode resistor 24 to a suitable source of anode voltage indicated at B+. In a manner to be described hereinafter either conductor 11 or conductor 14 will be grounded so that no signal from the associated sound head will be amplified by tube 16. The output signal developed across anode resistor 24 is fed to audio amplifier 25 to which is connected loud-speaker 26. Thus the audio signals from one of the sound heads 10 or 13 are amplified and reproduced while the signals from the other sound head are suppressed as will be more fully explained hereinafter.

Reels 3 and 4 of reproducer unit 1 are driven by reversible motor 30 having two field windings 31 and 32. The reels may, for example, be driven through drive shaft 33 indicated schematically in dotted lines. It will be understood that motor 30 is arranged in such a manner that when the flow of current through field winding 31 is reversed, the motor will rotate in the opposite direction. Reels 6, 7 of reproducer unit 2 are driven by reversible motor 34 through drive shaft 35. Motor 34 is provided with field windings 36 and 37 similar to those of motor 30.

Each reproducer unit 1 and 2 is provided with an associated trip switch 40 and 41, respectively. Normally open trip switches 40 and 41 are closed whenever the wire is almost completely removed from one of the reels 3, 4 or 6, 7. Let it be assumed that reproducer unit 1 is playing back the recorded program while wire 5 is wound from supply reel 3 to take up reel 4.

Figure 2:
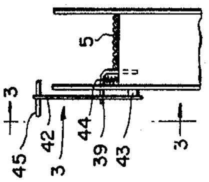
Fig. 2 is a side elevational view of one of the reels of a reproducer unit illustrating the manner in which a trip switch is actuated when the wire has almost been removed from the reel.
Figure 3:
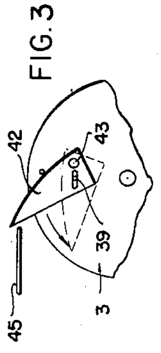
Fig. 3 is a front elevational view on the parts broken away of the reel of Fig. 2 taken on line 3—3 of Fig. 2.

Referring now to Figs. 2 and 3 there is illustrated supply reel 3 bearing a segment 42 pivoted at 43. Bent portion 39 of segment 42 is normally covered by wire 5 and is urged upwards by spring 44. When magnetic wire 5 has been completely removed from bent portion 39 as illustrated in Fig. 2, segment 42 is free to rotate about its pivot 43 and is urged by spring 44 into the position shown in full lines. Segment 42 now extends beyond the rim of reel 3 and when supply reel 3 is rotated in the direction of the arrow it will trip bar 45 forming part of trip switch 40 as illustrated schematically in Fig. 1. Thus trip switch 40 is closed. Take up reel 4 has a construction similar to that of supply reel 3, and when wire 5 is almost completely removed from take up reel 4, trip bar 45 and hence trip switch 40 will again be actuated. Trip switch 41 is operated in the same manner as is trip switch 40 by bar 45'.

In accordance with the present invention closure of trip switches 40 and 41 initiates a sequence of operations which will eventually reverse the operation of reproducer units 1 and 2 in a manner to be more fully explained hereinafter. To this end there are provided relays 47, 48, 49, 50, 51, 52, 53 and 54. Relays 47 to 54 are arranged in pairs, the relays of each pair 47, 48; 49, 50; 51, 52; and 53, 54 being arranged to be mechanically interlocked. Relay 47 is provided with armature 145 which is urged by spring 146 to rotate in a clockwise direction. Lever 147 is secured to armature 145. Relay 48 is also provided with an armature 150 to which lever 152 is secured. Spring 151 tends to rotate armature 150 and lever 152 in a counterclockwise direction. Thus when relay 47 is energized, its armature 145 and lever 147 will rotate in a counterclockwise direction whereupon lever 147 will disengage lever 152. Under the influence of spring 151, armature 150 and lever 152 are now free to rotate in a counterclockwise direction whereupon the two relays will again be interlocked in the opposite direction from that illustrated in Fig. 1. Relays 47 and 48 will remain interlocked even after the current energizing one of the relays has been interrupted. The other relay pairs 49, 50; 51, 52; and 53, 54 are also arranged to be mechanically interlocked in the same manner as are relays 47 and 48.

Relay 47 functions essentially as a motor disconnect relay which will disconnect motor 30. Relay 48 functions to connect motor 30 again to the power supply. Similarly relay 49 will disconnect motor 34 while relay 50 will connect it again to the power supply. Both relays 51 and 52 operate to reverse the direction of rotation of both motors 30 and 34. Relay 53 controls relays 51 and 52 while relay 54 determines whether the audio signal from sound head 10 or 13 is reproduced.

The control circuit of the present invention includes besides relays 47 to 54, thermal time delay relay 55 which has the purpose to provide a predetermined interval of time before motors 30 and 34 are energized again in a reversed direction thereby to insure that they have come to a full stop.

The control circuit of the present invention further includes control switch 57 having a movable arm 58 cooperating with fixed contacts 60, 61, 62 and 63. When switch arm 58 engages contact 60, the control circuit is arranged to provide for continuous operation of both reproducer units 1 and 2. When switch arm 58 engages contact 61, the cycle of operation will continue until reproducer unit 1 has finished its play back operation. Alternatively, when switch arm 58 engages contact 63, the operation of the units will be stopped when reproducer unit 2 has finished its play back operation. Finally, when switch arm 58 engages contact 62, both motors will remain shut off after their trip switches 40 and 41 have been actuated.

Referring now to the operation of the control circuit of the present invention, let it be assumed that power switch 65 is closed so that power leads 66 and 67 are energized. It may further be assumed that relays 48 to 54 are in the positions shown in Fig. 1 while movable arm 58 of control switch 57 engages contact 60 which is marked "continuous."

Closure of power switch 65 will energize field winding 31 of electric motor 30 through a circuit which may be traced from input lead 66, switch contact 68 of motor reverse relay 51 and its break contact through lead 70, field winding 31, lead 71, switch contact 72 of motor connect relay 48 and its make contact, leads 73, 74, switch contact 75 of motor reverse relay 52 and its make contact and lead 76, back to input lead 67.

Field winding 32 of motor 30 is energized through a circuit which may be traced from input lead 66, lead 78, winding 32, lead 80, switch contact 81 of motor connect relay 48 and its make contact, through lead 82 back to input lead 67. Field winding 36 of motor 34 is also energized through a circuit which may be traced through input lead 66, switch contact 68 and its break contact, lead 70 to winding 36 and thence through lead 83, switch contact 84 of motor connect relay 50 and its make contact and leads 85, 74 through switch contact 75 of motor reverse relay 52 and its make contact and lead 76 back to input lead 67. Field winding 37 of motor 34 is energized through input lead 66, lead 86, field winding 37, lead 87, switch contact 88 of motor connect relay 50 and its make contact, leads 90 and back to input lead 67.

Motors 30 and 34 are accordingly energized to drive reels 3, 4 and 6, 7 respectively. It will be assumed that reels 3, 4 are driven in such a direction that wire 5 is removed from the supply reel and wound on the take up reel in order to play back the recorded program. The audio signals are picked up by sound head 10 and impressed through conductor 11 upon control grid 20 of amplifier 16 for reproduction by loudspeaker 26. At the same time it is assumed that motor 34 is energized to run in the reverse direction so that wire 8 is rewound from the take up reel onto the supply reel. The signals which are developed by sound head 13 and impressed upon conductor 14 are grounded through lead 91 and switch contact 92 of audio control relay 54 and its make contact since armature 92 is grounded through sheaths 12 and 15 as shown.

Both motors 30 and 34 will now continue to run until trip switches 40 and 41 respectively are energized whereupon the motors are stopped as will appear presently. After both trip switches 40 and 41 have been actuated in the manner previously explained, and after a predetermined time interval has lapsed, motors 30 and 34 are again simultaneously energized to run in a reverse direction. At the same time the audio signals derived from sound head 10 and conductor 11 will be grounded while the audio signals developed by sound head 13 and impressed on conductor 14 will be impressed on control grid 18 of tube 16 to be reproduced by loud-speaker 26. This cycle of operation will continue indefinitely as long as movable arm 58 of control switch 57 engages fixed contact 60 as will be presently explained.

Let it be assumed that trip switch 40 is first actuated in the manner explained because wire 5 is almost completely unwound from supply reel 3. This will cause energization of motor disconnect relay 47. The circuit energizing motor disconnect relay 47 can be traced from input lead 66, leads 78, 93, trip switch 40, lead 94 through the winding of motor disconnect relay 47, lead 95, switch contact 81 of motor connect relay 48, and its make contact and through lead 82 back to input lead 67. It will be noted that motor disconnect relay 47 is energized before the armatures 72, 81 of motor connect relay 48 are allowed to move toward the right and thereby to disengage their make contacts. Thereafter the two relays 47 and 48 are again interlocked, and the circuit energizing the winding of motor disconnect relay 47 is broken by switch contact 81 which now engages its break contact. Furthermore, the circuits energizing field windings 31 and 32 of motor 30 are broken because switch contacts 72 and 81 engage their break contacts thus de-energizing motor 30.

The rewinding operation of magnetic reproducer 2 need not necessarily require the same amount of time as the play back operation of magnetic reproducer 1 so that trip switches 40 and 41 may be actuated at different times. Let it now be assumed that trip switch 41 is actuated. This in turn will energize motor disconnect relay 49 through a circuit which may be traced from input lead 66 through leads 86, 96, trip switch 41, lead 97 through the winding of motor disconnect relay 49, lead 98, switch contact 88 of motor connect relay 50 and its make contact and back through lead 90 to input lead 67. Accordingly, motor disconnect relay 49 trips over whereafter motor connect relay 50 is released and the two relays will interlock again. This will disconnect the circuit through the winding of motor disconnect relay 49 because armature 88 now engages its break contact. Motor 34 is now de-energized because the circuits energizing field windings 36 and 37 are broken since switch contacts 84 and 88 no longer engage their make contacts.

As soon as motor disconnect relays 47 and 49 have both been energized, motor reverse relay 51 is also energized. This circuit may be traced as follows. From input lead 66 through lead 100, switch contact 101 of motor reverse relay 52 and its make contact, lead 102 through the winding of motor reverse relay 51, lead 103, switch contact 104 of control relay 53 and its break contact, lead 105, switch contact 106 of motor disconnect relay 49 which now engages its make contact, lead 107, switch contact 81 of motor connect relay 48 and its break contact and back through leads 82, and input lead 67. Accordingly, motor reverse relay 51 trips over whereafter motor reverse relay 52 is released. Consequently, switch contact 101 of motor reverse relay 52 now engages its break contact which will break the circuit that energized motor reverse relay 51.

At the same time, that is, as soon as motor disconnect relays 47 and 49 have both been energized, time delay relay 55 will be energized. This circuit can be traced from input lead 66, lead 108, contact 60 and arm 58 of control switch 57, resistor 110 through heater element 111 of relay 55 and lead 112, switch contact 113 of motor disconnect relay 47 which now engages its make contact, lead 114, switch contact 88 of motor connect relay 50 which now engages its break contact and back through lead 90 and input lead 67. It will accordingly be obvious that both motor disconnect relays 47 and 49 must first be energized before time delay relay 55 can be energized. After a predetermined time interval which may amount to approximately 15 seconds, bimetallic strip 115 of relay 55 engages its fixed contact.

This will cause the following sequence of events. At first motor connect relay 48 is energized through a circuit including input lead 66, lead 108, bimetallic strip 115 and its fixed contact, leads 116, 117 through the winding of motor connect relay 48, lead 118, switch contact 120 of motor disconnect relay 47 which engages its make contact, lead 121 and back through lead 67. Accordingly, relays 47 and 48 return to the position illustrated in the drawing. Now motor connect relay 50 will also be energized through a circuit which includes bimetallic strip 115, leads 116, 122, the winding of motor connect relay 50, lead 123, switch contact 124 of motor disconnect relay 49 which now engages its make contact, lead 125, switch contact 120 which engages its break contact back through leads 121 and 67. Relays 49 and 50 have now also returned to the position illustrated in Fig. 1. Thus time delay relay 55 has the further function to prevent motor disconnect relays 47 and 49 from being energized again before motor reverse relay 51 has previously been energized.

As soon as relays 47, 48, 49, 50 are again in the position shown in Fig. 1, control relay 53 will be energized through a circuit which includes input lead 66, lead 100, switch contact 101 of motor reverse relay 52 which now engages its break contact, lead 126 through the winding of control relay 53, lead 127, switch contact 128 of audio control relay 54 and its make contact, lead 130, switch contact 124 and its break contact, lead 125, switch contact 120 and its break contact and back through leads 121 and 67. Control relay 53 is accordingly energized and releases audio control relay 54 whereupon the circuit for energizing relay 53 is broken by armature 128. Motor reverse relays 51, 52 and control relays 53, 54 control each other and are always in the same position after time delay relay 55 has been energized.

It will now be seen that motors 30 and 34 are again energized but since motor reverse relays 51 and 52 are in the position opposite from that shown in Fig. 1, both motors will run in a direction which is reversed with respect to their previous direction of rotation.

Thus the circuit for energizing winding 31 of motor 30 can now be traced through input lead 67, switch contact 68 of motor reverse relay 51 which engages its make contact, lead 70 through winding 31 and back through lead 71, armature 72 and its make contact, leads 73, 74, switch contact 75 and its break contact, lead 100 to input lead 66. Since the current now flows through field winding 31 in the opposite direction, motor 30 also runs in the opposite direction. Similarly, the current flow through field winding 36 of motor 34 can be traced through input lead 67, switch contact 68 and its make contact, lead 70, winding 36, lead 83, switch contact 84 and its make contact and back through leads 85, 74, switch contact 75 and its break contact and lead 100 to input lead 66. The circuits through field windings 32 and 37 of motors 30 and 34 are the same as previously explained.

Consequently, magnetic reproducer 1 will now rewind wire 5 while magnetic reproducer 2 performs the play back operation. The signal obtained from sound head 10 and conductor 11, is now grounded through lead 131, armature 92 and its break contact. The signal obtained from sound head 13 and conductor 14 is impressed upon control grid 18 and will be reproduced by loud-speaker 26.

As soon as wire 5 has been rewound and wire 8 played back, trip switches 40 and 41 are again actuated thereby to energize motor disconnect relays 47 and 49 in the manner previously explained. As soon as both motor disconnect relays 47 and 49 have been energized, motor reverse relay 52 will be energized. This circuit can be traced from input lead 66, lead 132, switch contact 133 of motor reverse relay 51 which is now connected to its make contact, lead 134 through the winding of motor reverse relay 52, lead 135, switch contact 104 engaging its make contact, lead 105, switch contact 106 and its make contact, lead 107, armature 81 and its break contact and back through lead 82 to input lead 67. Motor reverse relays 51 and 52 are now again in the position illustrated in Fig. 1.

At the same time, that is, as soon as motor disconnect relays 47 and 49 have been energized, time delay relay 55 is again energized until after the predetermined time delay bimetallic strip 115 engages its fixed contact. This will again cause energization of motor connect relays 48 and 50 in the manner previously explained. Furthermore, audio control relay 54 will be energized through a circuit which may be traced from input lead 66, lead 132, switch contact 133 and its break contact, lead 136 and the winding of audio control relay 54, lead 137, switch contact 138 and its make contact, leads 140, 130, switch contact 124 and its break contact, lead 125, switch contact 120 and its break contact and back through leads 121 and 67. Audio control relay 54 is accordingly energized following the energization of motor reverse relay 52 and since all relays 48 to 54 are now again in the position shown in Fig. 1, the cycle of operation repeats.

As long as arm 58 of control switch 57 engages contact 60, one of the magnetic reproducers 1 and 2 will be rewinding while the other will perform the play back operation whereafter the role of the two reproducers automatically is exchanged. However, if arm 58 of control switch 57 is rotated to engage fixed contact 61, the cycle of operations will terminate when reproducer 1 has finished its play back operation. Let it now be assumed that relays 47 to 54 are in the position shown in Fig. 1 while movable arm 58 of control switch 57 engages contact 61. As soon as units 1 and 2 have finished their respective operations, trip switches 40 and 41 will be energized which in turn will energize motor disconnect relays 47 and 49 as previously explained. Furthermore, motor reverse relay 51 will be energized as already explained as soon as motor disconnect relays 47 and 49 have both been energized. However, time delay relay 55 cannot be energized. The circuit through heater element 111 of time delay relay 55 may be traced from input lead 67, switch contact 68 and its make contact, leads 70, 141, fixed contact 61, arm 58, resistor 110, heater element 111, lead 112, switch contact 113 and its make contact, lead 114, switch contact 88 and its break contact and lead 90 back to input lead 67 so that heater element 111 is not energized. The whole operation of the control circuit is now stopped because unless time delay relay 55 is energized, motors 30 and 34 cannot be started again.

It may now be assumed that while arm 58 of control switch 57 engages fixed contact 61, magnetic reproducer 1 rewinds while reproducer 2 performs its play back operation. Accordingly, relays 47, 48 and 49, 50 are in the position shown in Fig. 1, while relays 51, 52 and 53, 54 are in the opposite position to that shown in Fig. 1. As soon as trip switches 40 and 41 are actuated, motor disconnect relays 47 and 49 will be energized. Consequently, motor reverse relay 52 will be energized as previously explained. Now thermal time delay relay 55 can be energized because fixed contact 61 is now connected to input lead 66 through switch contact 69 of motor reverse relay 51 and its break contact. The cycle of operations will accordingly continue with reproducer unit 1 playing back the recorded material while unit 2 rewinds its wire 8. After both units have finished their operations, the motors cannot be started again as has already been explained.

If arm 58 of control switch 57 engages fixed contact 63, this will have the effect of shutting off both motors after magnetic reproducer 2 has finished its play back operation. Let it be assumed again that relays 47 to 54 are in the position shown in the drawing so that reproducer 1 will play back the recorded program while unit 2 will rewind. As soon as trip switches 40 and 41 are energized, motor disconnect relays 47 and 49 will be energized. Consequently, motor reverse relay 51 is energized as has previously been explained. Now thermal time delay relay 55 is energized through a circuit which may be traced as follows. From input lead 66, lead 100, switch contact 75 and its break contact, leads 74, 143, fixed contact 63, resistor 110 through heater element 111, lead 112, switch contact 113 and its make contact, lead 114, armature 88 and its break contact, lead 90 and back to input lead 67.

As soon as bimetallic strip 115 engages its fixed contact, motor connect relays 48 and 50 are energized, and subsequently control relay 53, as has already been explained. Accordingly, at this time relays 47, 48 and 49, 50 are in the position shown in Fig. 1 while relays 51, 52 and 53, 54 are in the opposite position. Magnetic reproducer 1 will accordingly now rewind, while reproducer 2 will play back the recorded program. As soon as units 1 and 2 have finished their operations, trip switches 40 and 41 are actuated to energize motor disconnect relays 47 and 49. This in turn will cause energization of motor reverse relay 52 so that relays 51, 52 return to the position shown in Fig. 1. Time delay relay 55 can now no longer be energized because armature 75 of motor reverse relay 52 engages its make instead of its break contact. Hence at this point the operation stops.

When it is desired to cut off both motors 30 and 34 as soon as they have finished their operation, arm 58 of control switch 57 is turned to engage fixed contact 62. In this position of control switch 57 it will be obvious that heater element 111 of time delay relay 55 cannot be energized. Therefore, when trip switches 40 and 41 have been actuated to energize motor disconnect relays 47 and 49, the motors cannot be started again.

It will be understood that time delay relay 55 is not absolutely essential for the operation of the control circuit of the present invention. However, it will prevent breaking of the magnetic recording material 5 or 8 due to the fact that one of the motors may still be running when it is energized to run in the opposite direction.

It will be noticed that relays 47 to 54 need only be energized momentarily and therefore their consumption of power is very small. Interruption of the power supply or opening of power switch 65 will not change the cycle of operation in view of the fact that the eight relays 47 to 54 are mechanically interlocked and will remain in their position until one of them is energized.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A circuit for controlling the operation of two magnetic reproducers, each having a recording medium, a sound head, a supply reel, a takeup reel, and a reversible reel driving motor having a pair of field windings, comprising a power circuit; circuits connecting said field windings across said power circuit; normally closed disconnect contacts in each of said field winding circuits; polarity reversing contacts in one field winding circuit of each motor; a trip circuit for each motor connected to said power circuit and comprising a trip switch and a motor disconnect relay connected in series with said disconnect contacts; means on each reel to operate said trip switches to energize said disconnect relays a disconnect circuit connected across said power circuit comprising a motor connect relay for each motor for actuating said disconnect contacts coupled to maintain them closed during normal operation and normally open contacts in series with said connect relays actuated by one of said disconnect relays to be closed to energize said connect relays, said connect relay and said disconnect relay being respectively mechanically interlocked to lock one another; a motor reversing control circuit connected across said power circuit and comprising a pair of mechanically interlocked motor reversing relays for actuating said polarity reversing contacts, contacts actuated by one of said disconnect relays and one of said connect relays to be closed thereby to energize said motor reversing relays and effect motor reversal; a switching circuit connected to said sound heads comprising a contact for each sound head and a grounded switch member movable into engagement with either of said sound head contacts; a sound head control circuit connected to said power circuit including a relay operatively associated with said grounded switch member, contacts actuated by said disconnect relays and one of said motor reversing relays to be closed thereby, and another contact; and a circuit connected to said power circuit for controlling said sound head control circuit comprising contacts actuated by another one of said reversing relays and said sound head control relay to be closed thereby and a relay mechanically interlocked with said sound head control relay and operatively associated with said other contact in said sound head control circuit to close said other contact and effect switching of sound heads.

2. A circuit for controlling the operation of two magnetic reproducers, each having a recording medium, a sound head, a supply reel, a takeup reel, and a reversible reel driving motor having a pair of field windings, comprising a power circuit; circuits connecting said field windings across said power circuit; normally closed disconnect contacts in each of said field winding circuits; polarity reversing contacts in one field winding circuit of each motor; a trip circuit for each motor connected to said power circuit and comprising a trip switch and a disconnect relay connected in series with said disconnect contacts; means on each reel to operate said trip switches to energize said disconnect relays a disconnect circuit connected across said power circuit and comprising a connect relay for each motor for actuating said disconnect contacts and in series with normally open contacts, actuated by energization of one of said disconnect relays to be closed thereby to energize said connect relays, said connect relay and said disconnect relay being mechanically interlocked to lock one another; a motor reversing control circuit connected across said power circuit and comprising a pair of mechanically interlocked relays for actuating said polarity reversing contacts and contacts actuated by one of said trip relays and one of said disconnect relays to be closed thereby to energize said motor reversing relays and effect motor reversal; a switching circuit connected to said sound heads comprising a contact for each sound head and a grounded switch member movable into engagement with either of said sound head contacts; a sound head control circuit connected to said power circuit including a relay for actuating said grounded switch member, a contacts actuated by said disconnect relays and one of said motor reversing relays to be closed thereby, and another contact; and a circuit connected to said power circuit for controlling said sound head control circuit and operatively associated with another one of said reversing relays, said sound head control relay and said other contact in said sound head control circuit to close said other contact and effect switching of sound heads.

3. A circuit for controlling the operation of two magnetic reproducers, each having a recording medium, a sound head, a supply reel, a takeup reel, and a reversible reel driving motor having a pair of field windings, comprising a power circuit; circuits connecting said field windings across said power circuit; normally closed disconnect contacts in each of said field winding circuits; polarity reversing contacts in one field winding circuit of each motor; a trip circuit for each motor connected to said power circuit and comprising a trip switch and a disconnect relay connected in series with said disconnect contacts; means on each reel to operate said trip switches to energize said disconnect relays a disconnect circuit connected across said power circuit and comprising a motor connect relay for each motor for actuating said disconnect contacts and normally open contacts in series with said connect relays actuated by one of said disconnect relays to be closed thereby to energize said disconnect relays, said connect relay and said disconnect relay being mechanically interlocked to lock one another; a motor reversing control circuit connected across said power circuit and comprising a pair of mechanically interlocked relays for actuating said polarity reversing contacts and contacts actuated by one of said disconnect relays and one of said connect relays to be closed thereby to energize said motor reversing relays and effect motor reversal; a switching circuit connected to said sound heads comprising a contact for each sound head and a grounded switch member movable into engagement with either of said sound head contacts; a sound head control circuit connected to said power circuit and connected for actuation by said grounded switch member, said tripping relays and one of said motor reversing relays to be closed thereby; and a circuit connected to said power circuit for controlling said sound head control circuit and operatively associated with another one of said reversing relays and said sound head control circuit for effecting switching of sound heads.

4. A circuit for controlling the operation of two magnetic reproducers, each having a recording medium, a sound head, a supply reel, a takeup reel, and a reversible reel driving motor having a pair of field windings, comprising a power circuit; circuits connecting said field windings across said power circuit; normally closed disconnect contacts in each of said field winding circuits; polarity reversing contacts in one field winding circuit of each motor; a trip circuit for each motor connected to said power circuit and comprising a trip switch and a disconnect relay connected in series with said disconnect contacts; means on each reel to operate said trip contacts to energize said disconnected relays; a disconnect circuit connected across said power circuit and comprising a motor connect relay for each motor for actuating said disconnect contacts and normally open contacts in series with said connect relay, actuated by one of said disconnect relays to be closed thereby to energize said disconnect relays, said connect relay and said disconnect relay being mechanically interlocked to lock one another; a motor reversing control circuit connected across said power circuit and comprising a pair of mechanically interlocked relays actuating said polarity reversing contacts and contacts actuated by one of said trip relays and one of said disconnect relays to be closed thereby to energize said motor reversing relays and effect motor reversal; a switching circuit connected to said sound heads; a sound head control circuit connected to said power circuit and said switching circuit, said disconnect relays and one of said motor reversing relays to be closed thereby; and a circuit connected to said power circuit for controlling said sound head control circuit and operatively associated with another one of said reversing relays and said sound head control circuit for effecting switching of sound heads.

5. A circuit for controlling the operation of two magnetic reproducers, each having a recording medium, a sound head, a supply reel, a takeup reel, and a reversible reel driving motor having a pair of field windings, comprising a power circuit; circuits connecting said field windings across said power circuit; normally closed disconnect contacts in each of said field winding circuits; polarity reversing contacts in one field winding circuit of each motor; a trip circuit for each motor connected to said power circuit and comprising a trip switch and a disconnect relay connected in series with said disconnect contacts; means on each reel to operate said trip contacts to energize said disconnect relays; a disconnect circuit connected across said power circuit and comprising a connect relay for each motor for actuating said disconnect contacts and normally open contacts in series with said connect relay, actuated by one of said disconnect relays to be closed thereby to energize said disconnect relays, said connect relay and said disconnect relay being mechanically interlocked to lock one another; a motor reversing control circuit connected across said power circuit and operatively associated with said polarity reversing contacts and with one of said trip relays and one of said disconnect relays for energizing said motor reversing relays and effecting motor reversal; a switching circuit connected to said sound heads; a sound head control circuit connected to said power circuit and operatively associated with said switching circuit, said disconnect relays and one of said motor reversing relays to be closed thereby; and a circuit connected to said power circuit for controlling said sound head control circuit and operatively associated with another one of said reversing relays and said sound head control circuit for effecting switching of sound heads.

6. A circuit for controlling the operation of two magnetic reproducers, each having a recording medium, a sound head, a supply reel, a takeup reel, and a reversible reel driving motor having a pair of field windings, comprising a power circuit; circuits connecting said field windings across said power circuit; normally closed disconnect contacts in each of said field winding circuits; polarity reversing contacts in one field winding circuit of each motor; a trip circuit for each motor connected to said power circuit and comprising a trip switch and a disconnect relay connected in series with said disconnect contacts; means on each reel to operate said trip contacts to energize said disconnect relays; a disconnect circuit connected across said power circuit and operatively associated with said disconnect contacts and one of said disconnect relays to be closed thereby to actuate said disconnect contacts; a motor reversing control circuit connected across said power circuit and operatively associated with said polarity reversing contacts and with one of said disconnect relays and said disconnect circuit for actuating said reversing contacts and effecting motor reversal; a switching circuit connected to said sound heads; a sound head control circuit connected to said power circuit and operatively associated with said switching circuit, said disconnect relays and said motor reversing circuit to be closed thereby; and a circuit connected to said power circuit for controlling said sound head control circuit and operatively associated with said reversing circuit and said sound head control circuit for effecting switching of sound heads.

7. A circuit for controlling the operation of two magnetic reproducers, each having a recording medium, a sound head, a supply reel, a takeup reel, and a reversible reel driving motor having a pair of field windings, comprising a power circuit; circuits connecting said field windings across said power circuit; normally closed disconnect contacts in each of said field winding circuits; polarity reversing contacts in one field winding circuit of each motor; a trip circuit for each motor connected to said power circuit and comprising a trip switch; means on each reel for operating said trip contacts to actuate said trip circuit; a disconnect circuit connected across said power circuit and operatively associated with said disconnect contacts and said trip circuit to operate said disconnect contacts; a motor reversing control circuit connected across said power circuit and operatively associated with said polarity reversing contacts and with said trip circuit and said disconnect circuit for actuating said reversing contacts and effecting motor reversal; a switching circuit connected to said sound heads; a sound head control circuit connected to said power circuit and operatively associated with said switching circuit, said tripping circuit and said motor reversing circuit to be closed thereby; and a circuit connected to said power circuit for controlling said sound head control circuit and operatively associated with said sound head control circuit for effecting switching of sound heads.

8. A circuit for controlling the operation of two magnetic reproducers, each having a recording medium, a sound head, a supply reel, a takeup reel, and a reversible reel driving motor having a pair of field windings, comprising a power circuit; circuits connecting said field windings across said power circuit; normally closed disconnect contacts in each of said field winding circuits; polarity reversing contacts in one field winding circuit of each motor; a trip circuit for each motor connected to said power circuit and comprising a disconnect switch and means on said reels for operating said trip switches; a disconnect circuit connected across said power circuit and operatively associated with said disconnect contacts and one of said trip circuits to operate said disconnect contacts; a motor reversing control circuit connected across said power circuit and operatively associated with said polarity reversing contacts and with said trip circuit and said disconnect circuit for actuating said motor reversing contacts and effecting motor reversal; and a switching circuit connected to said sound heads operatively associated with said reversing circuit for effecting switching of sound heads.

9. A circuit for controlling the operation of two magnetic reproducers, each having a recording medium, a sound head, a supply reel, a takeup reel, and a reversible reel driving motor having a field winding, comprising a power circuit; circuits connecting said field windings across said power circuit; normally closed disconnect contacts in each of said field winding circuits; polarity reversing contacts in the field winding circuit of each motor; a trip circuit for each motor connected to said power circuit and comprising a trip switch means mounted on each reproducer for operating said trip circuit; a disconnect circuit connected across said power circuit and operatively associated with said disconnect contacts and a trip circuit to operate said disconnect contacts; a motor reversing control circuit connected across said power circuit and operatively associated with said polarity reversing contacts and with said trip circuit and said disconnect circuit for actuating said reversing contacts and effecting motor reversal; and a switching circuit connected to said sound heads operatively associated with said reversing circuit for effecting switching of sound heads.

10. A circuit for controlling the operation of two magnetic reproducers, each having a recording medium, a sound head, a supply reel, a takeup reel, and a reversible reel driving motor having a field winding, comprising a power circuit; circuits connecting said field windings across said power circuit; normally closed disconnect contacts in each of said field winding circuits; polarity reversing contacts in the field winding circuit of each motor; a trip circuit for each motor connected to said power circuit and comprising a trip switch means on each reel for actuating said trip circuit; a disconnect circuit connected across said power circuit and operatively associated with said disconnect contacts and a trip circuit to operate said disconnect contacts; and a motor reversing control circuit connected across said power circuit and operatively associated with said polarity reversing contacts and with said trip circuit for actuating said reversing circuit and effecting motor reversal.

11. A circuit for controlling the operation of two magnetic reproducers, each having a recording medium, a sound head, a supply reel, a takeup reel, and a reversible reel driving motor having a field winding, comprising a power circuit; circuits connecting said field windings across said power circuit; disconnect contacts in each of said field winding circuits; polarity reversing contacts in the field winding circuit of each motor; a trip circuit connected to said power circuit and comprising a trip switch and means on each reel for actuating said trip circuit; a disconnect circuit connected across said power circuit and operatively associated with said disconnect contacts and said trip circuit to operate said disconnect contacts; and a motor reversing control circuit connected across said power circuit and operatively associated with said polarity reversing contacts for energizing said reversing circuit and effecting motor reversal.

12. A circuit for controlling the operation of two magnetic reproducers, each having a recording medium, a sound head, a supply reel, a takeup reel, and a reversible reel driving motor having a field winding, comprising a power circuit; circuits connecting said field windings across said power circuit; a disconnect switch in each of said field winding circuits; a polarity reversing switch in the field winding circuit of each motor; a trip circuit for each motor connected to said power circuit means on each reel to actuate said trip circuit; a disconnect circuit connected across said power circuit and operatively associated with said disconnect switch and said trip circuit to operate said disconnect switch; a motor reversing control circuit connected across said power circuit and operatively associated with said polarity reversing switch for energizing said reversing circuit and effecting motor reversal.

LOUIS F. MAYLE.

REFERENCES CITED

The following references are of record in the file of this patent:

UNITED STATES PATENTS

| Number | Name | Date |
|---|---|---|
| 773,985 | Ries | Nov. 1, 1904 |
| 1,151,991 | Balzer | Aug. 31, 1915 |
| 1,325,825 | Bailey | Dec. 23, 1919 |
| 1,939,181 | McCash et al. | Dec. 12, 1933 |